United States Patent [19]

Sakita

[11] Patent Number: 4,826,194
[45] Date of Patent: May 2, 1989

[54] TWO-WHEEL VEHICLE WITH AUXILIARY SUPPORT SYSTEM

[76] Inventor: Masami Sakita, 307 Beresford Ave., Redwood City, Calif. 94061

[21] Appl. No.: 112,552

[22] Filed: Oct. 26, 1987

[51] Int. Cl.[4] ............................................. B62H 1/12
[52] U.S. Cl. ................................... 280/302; 280/303
[58] Field of Search .............. 280/293, 297, 301, 302, 280/303, 112 A, 755, 298, 299, 300; 180/209, 219

[56] References Cited

U.S. PATENT DOCUMENTS

| 1,006,804 | 10/1911 | Swanson | 180/209 |
|---|---|---|---|
| 1,315,048 | 9/1919 | Stark | 280/302 |
| 1,358,252 | 11/1920 | Schneider | 180/30 |
| 1,390,441 | 9/1921 | Jackson | 180/30 |
| 1,403,249 | 1/1922 | Johanknecht | 180/209 |
| 3,236,323 | 2/1966 | Austin | 180/30 |
| 3,980,150 | 9/1976 | Gigli | 180/30 |
| 4,133,402 | 1/1979 | Soo Hoo | 180/30 |

FOREIGN PATENT DOCUMENTS 699558 2/1931 France .

Primary Examiner—David M. Mitchell
Assistant Examiner—Richard Lamby
Attorney, Agent, or Firm—Victor R. Beckman

[57] ABSTRACT

An auxiliary side wheel assembly for use with a two wheel vehicle, such as a motorcycle, is shown which includes right and left arms at opposite sides of the vehicle which arms are attached to a connecting shaft extending transversely of the vehicle. The arms extend downwardly and rearwardly from the connecting shaft and are provided with left and right ground engaging auxiliary wheels at the lower ends thereof. A releasable lock engagable with the auxiliary wheel assembly releasably locks the same against upward pivotal rotation about the connecting shaft. In the locked condition, the vehicle is stabilized to prevent tipping onto its side, which stability is of particular benefit during low speed operation and when the vehicle is stopped.

26 Claims, 4 Drawing Sheets

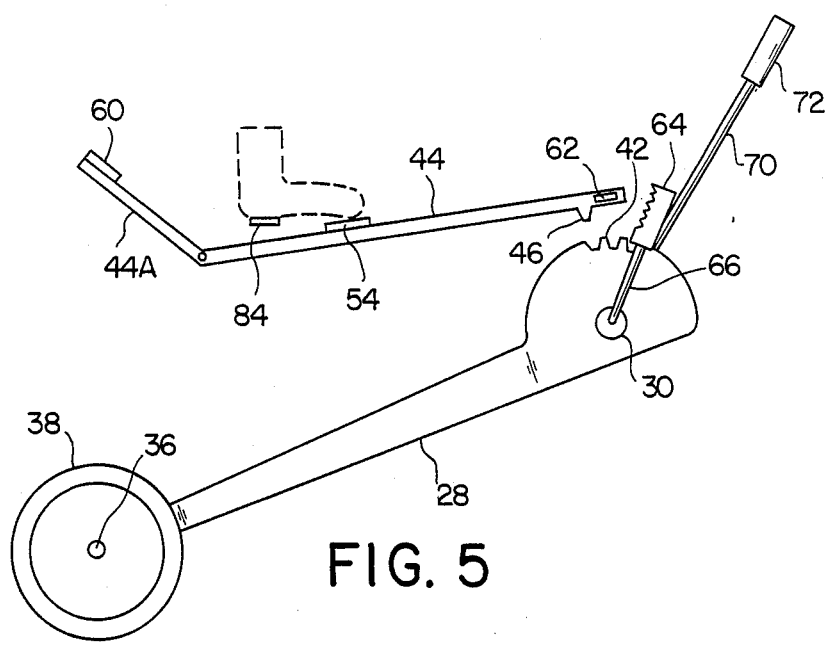
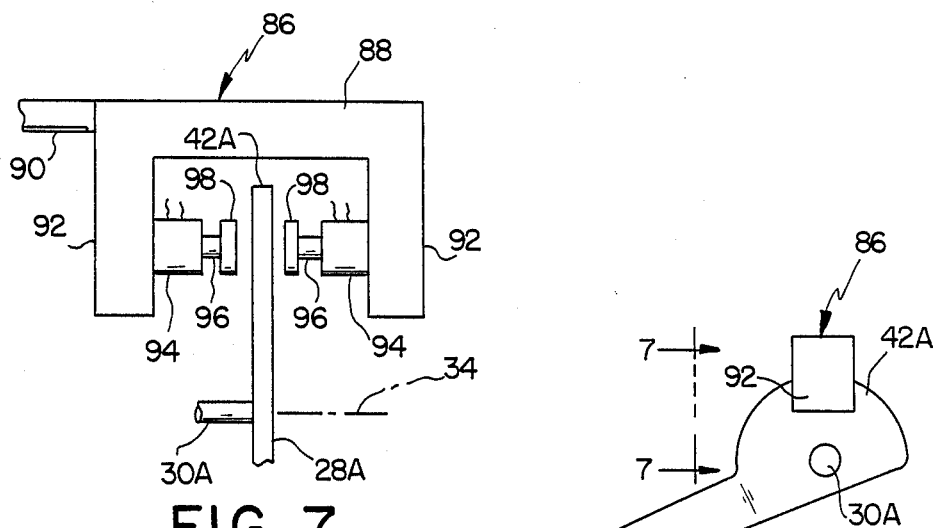
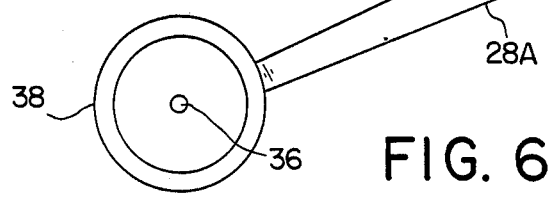

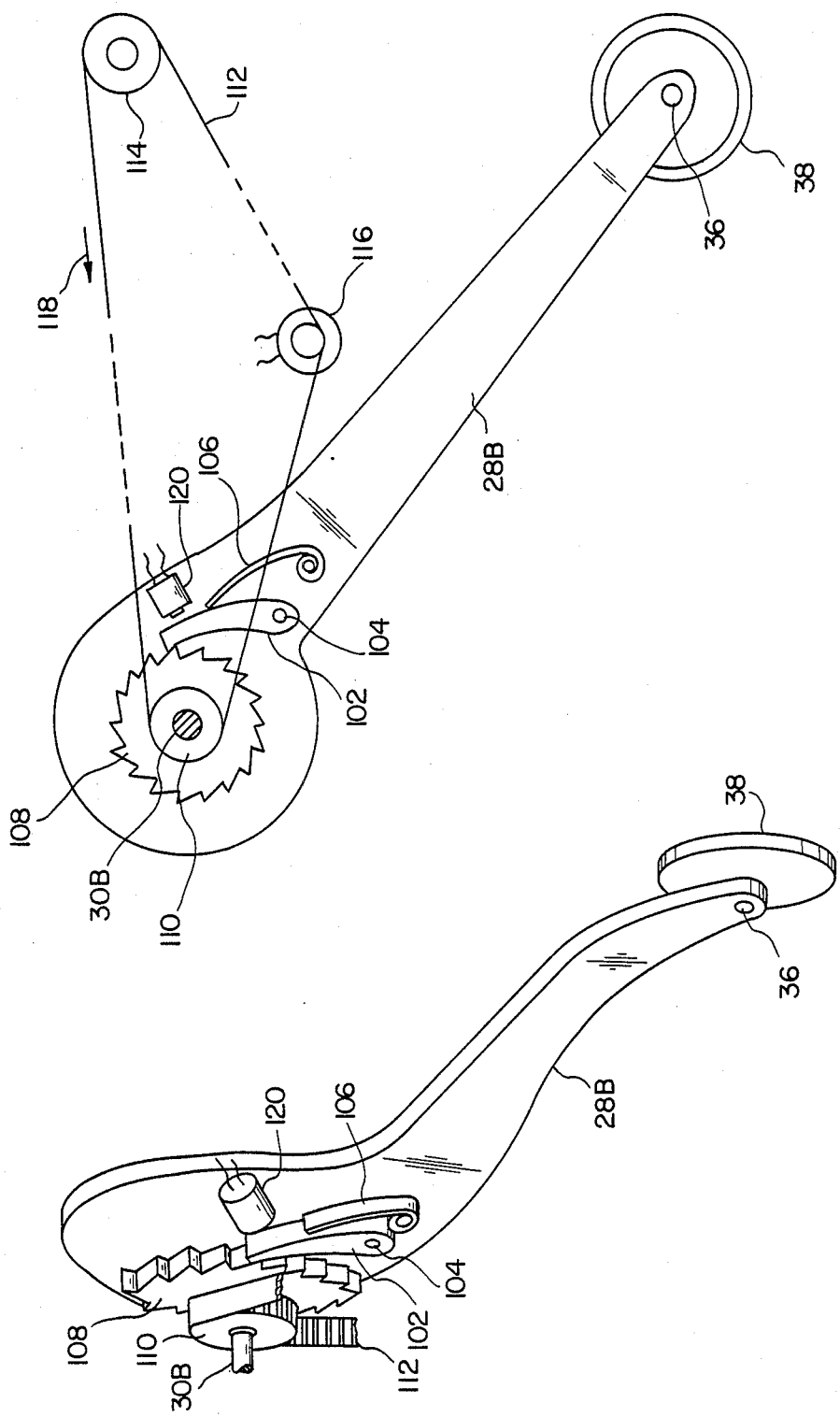

TWO-WHEEL VEHICLE WITH AUXILIARY SUPPORT SYSTEM

FIELD OF THE INVENTION

This invention relates generally to an auxiliary support system for a two-wheel vehicle such as a motorcycle or bicycle, and more particularly to such a system which includes a pair of interconnected auxiliary wheels at opposite sides of the vehicle at least one of which wheels normally engages the ground at all times, and which may be releasably locked in position to maintain the vehicle in an upright stable position when stopped or traveling slowly.

BACKGROUND OF THE INVENTION

Auxiliary support systems for two-wheel vehicles are well known as shown, for example in the following U.S. Pat. Nos. 4,133,402—Soo Hoo; 3,980,150—Gigli; 3,236,323—Austin; 1,403,249—Johanknecht; 1,390,441—Jackson; 1,358,252—Schneider; and 1,006,804—Swanson. In prior art arrangements the auxiliary wheels are manually or hydraulically operated between a raised inoperative position and lowered ground-engaging position. Many such arrangements are relatively complex which adds to the initial and maintenance costs thereof, in addition to the weight of the vehicle. Often, the prior art auxiliary wheeled support systems are bulky, unattractive, and very conspicuous.

OBJECTS AND SUMMARY OF THE INVENTION

An object of this invention is the provision of an improved auxiliary support system for two-wheeled vehicles which avoids the above-mentioned and other shortcomings and disadvantages of prior art systems of this general type.

An object of this invention is the provision of an improved auxiliary support system for two-wheeled vehicles which is of extremely simple design, which may be employed with vehicles of many different designs, and which is relatively inexpensive to manufacture.

An object of this invention is the provision of an auxiliary support system of the above-mentioned type which does not require raising or lowering of the auxiliary wheels, but which only requires locking the auxiliary support system against upward movement of the wheels when stopped or when travelling slowly.

An object of this invention is the provision of an improved auxiliary support system of the above-mentioned type which is relatively small, light-weight, and aesthetically attractive.

The above and other objects and advantages of this invention are achieved by use of an auxiliary wheel assembly which includes a pair of right and left arms which are rigidly interconnected by a connecting shaft that is journaled for pivotal movement about an axis which extends transversely of the two-wheel vehicle. Right and left auxiliary ground engaging wheels are mounted on the respective right and left arms. The arms extend rearwardly from the connecting shaft and gravity and resilient biasing means pivotally bias the assembly downwardly whereby at least one of the auxiliary wheels engages the ground at all times. During operation of the vehicle at normal speeds, the interconnected arms are free to pivot about the connecting shaft axis. Locking means are provided for releasably locking the auxiliary wheel assembly against at least upward pivotal movement about the connecting shaft. In the locked condition, the vehicle is prevented from falling over by engagement of an auxiliary wheel with the ground. Mechanically, electrically and/or hydraulically operated locking means may be employed, which locking means may be either manually or automatically controlled.

BRIEF DESCRIPTION OF THE DRAWINGS

The invention, together with other objects and advantage thereof will be better understood from the following description considered with the accompanying drawings. In the drawings, wherein like reference characters refer to the same parts in the several views:

FIG. 5 is a right side elevational view of the auxiliary support system shown in FIG. 1;

FIG. 6 is a view which is similar to that of FIG. 5 but showing a modified form of this invention employing an electrically operated locking mechanism;

FIG. 7 is an enlarged view taken along line 7—7 of FIG. 6; and

FIGS. 8 and 9 are sectional and perspective views, respectively, showing another modified form of this invention employing a ratchet and pawl mechanism for locking the auxiliary support system against upward movement thereof when the vehicle is stopped.

Figure 1:
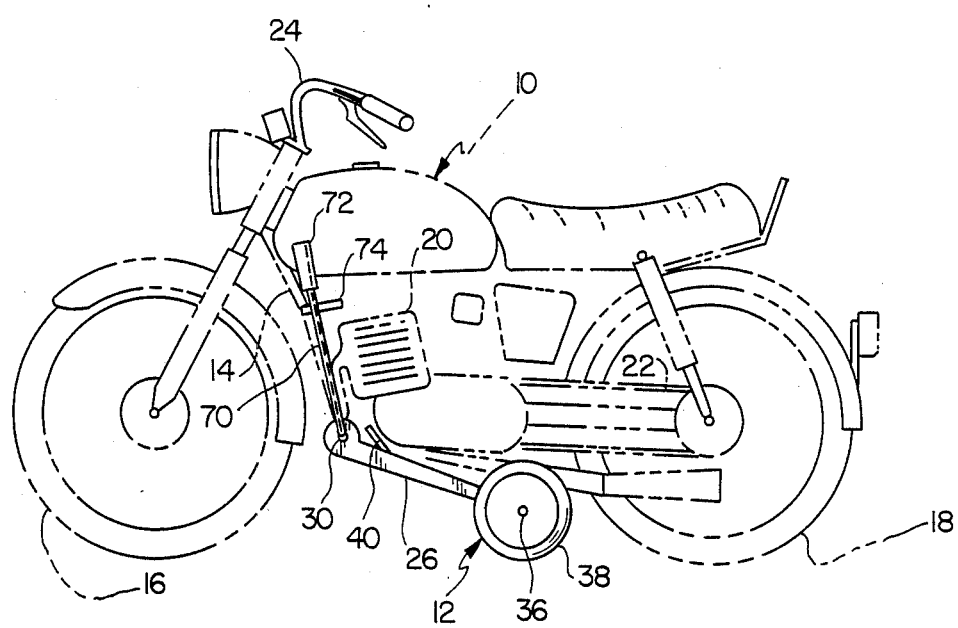
FIG. 1 is a phantom side elevational view of a motorcycle showing an embodiment of the auxiliary support system attached thereto.
Figure 2:
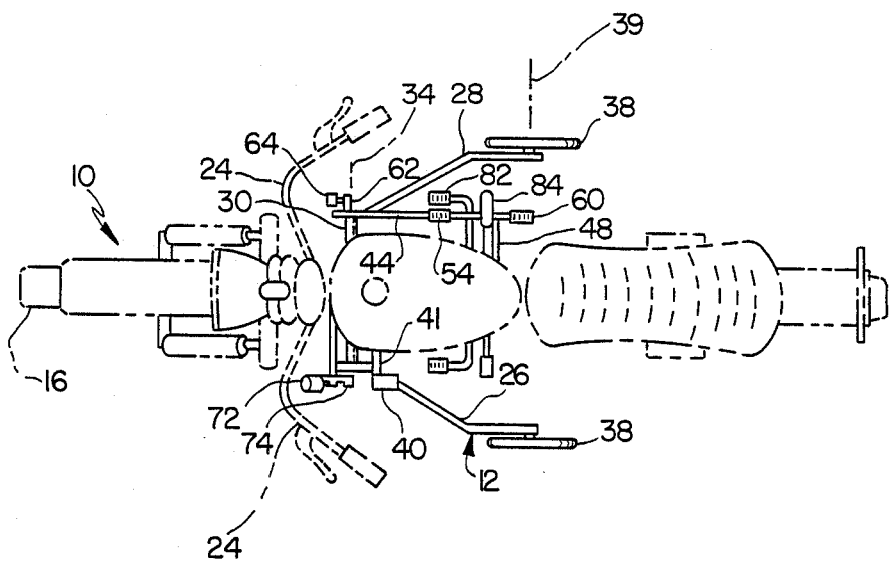
FIG. 2 is a plan view of the motorcycle and auxiliary support system shown in FIG. 1.

Reference now is made to FIGS. 1 and 2 of the drawings wherein a two wheel motorized vehicle 10 in the form of a motorcycle is shown to which the auxiliary support system 12 of this invention is attached. The motorcycle includes a frame 14 supported by a steerable front wheel 16 and a rear wheel 18. It is powered by an engine 20 connected to the rear wheel by a chain 22, and is steered by use of handle bars 24,24. The auxiliary support system 12 comprises a part of a new motorcycle, or may be attached to an existing motorcycle.

Figure 3:
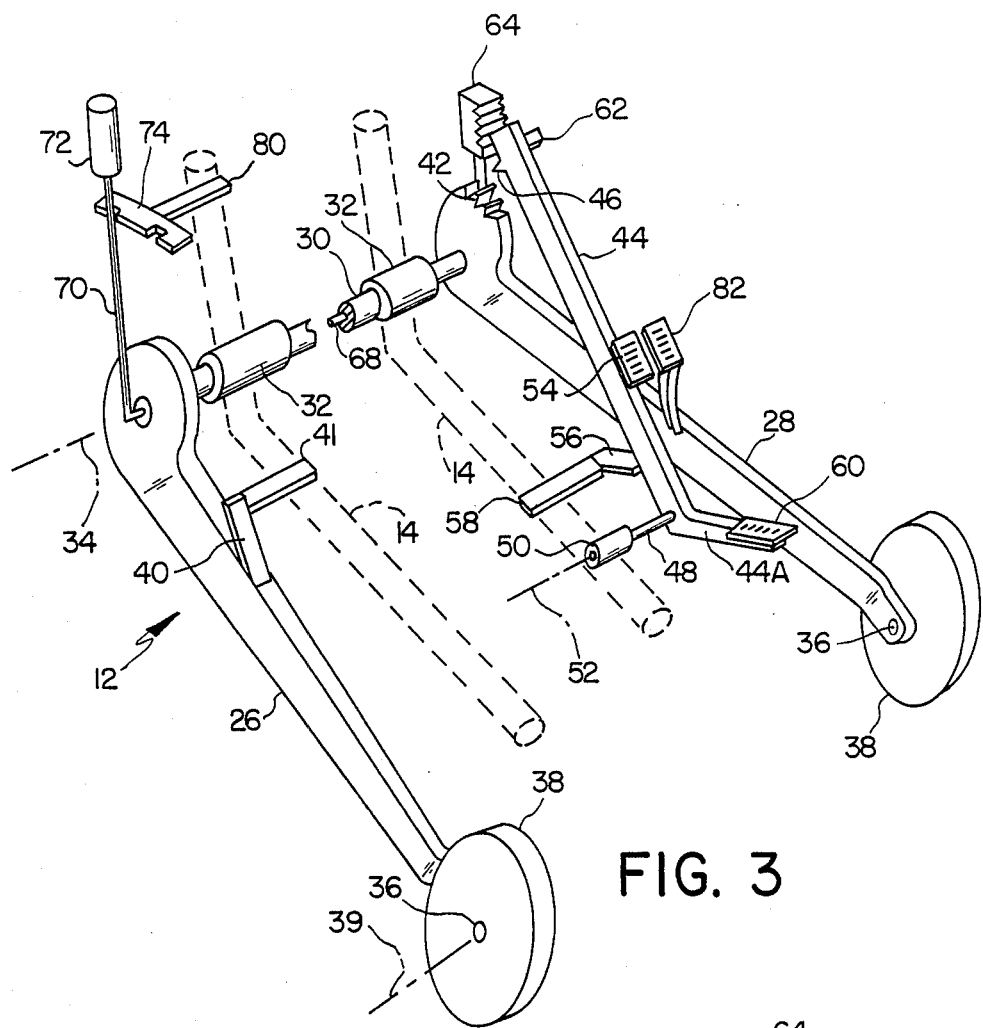
FIG. 3 is a perspective view of the auxiliary support system shown in FIG. 1.

Referring also to FIG. 3, the auxiliary support system 12 includes left and right arm 26 and 28, respectively, which are interconnected by a tubular connecting shaft 30. Shaft 30 is journaled in bearings 32,32 fixedly secured to the motorcycle frame 14 as by welding, clamping, or other suitable means, not shown, and it is adapted for pivotal movement about an axis 34 extending transversely of the motor cycle. Left and right arms 26 and 28 are fixedly secured to opposite ends of tubular connecting shaft 30 whereby the two arms are simultaneously pivoted upon pivotal movement of either arm. Arms 26 and 28 extend rearwardly and downwardly from connecting shaft 30, and are angled adjacent the upper and lower ends thereof so as to also extend generally outwardly from opposite sides of the motorcycle. Axles 36,36 are located adjacent the lower ends of arms 26 and 28 for rotatable support of auxiliary wheels 38,38. The wheels rotate about an axis 39 extending parallel to axis 34 about which arms 26 and 28 rotate.

Spring means of any suitable type is included for resiliently biasing arms 26 and 28 downwardly and, for purposes of illustration only, a leaf spring 40 is shown attached to frame 14 by a bracket 41, which spring engages an upwardly facing surface of arm 26 to resiliently urge the same downwardly. In use, both spring biasing means 40 and gravity bias the arms 26 and 28 downwardly such that at least one of the auxiliary wheels 38,38 engages the ground at all times. If the ground was level and the motorcycle was in an upright position such that the longitudinal midplane thereof was normal to the ground, then both auxiliary wheels would simultaneously engage the ground.

Locking means are included for locking the auxiliary support system 12 against rotation about pivot axis 34. In the locked condition, the auxiliary wheels provide added support and stability to the motor cycle. Although the auxiliary support system may be locked in position at any speed, it is primarily intended to be locked in position at low speeds, or when the motorcycle is stopped, to prevent tipping of the motorcycle during such times. In this way, even heavy two wheel vehicles may be operated without fear of tipping over when coming to a stop, when stopped, or when starting up from a stop.

Figure 4:
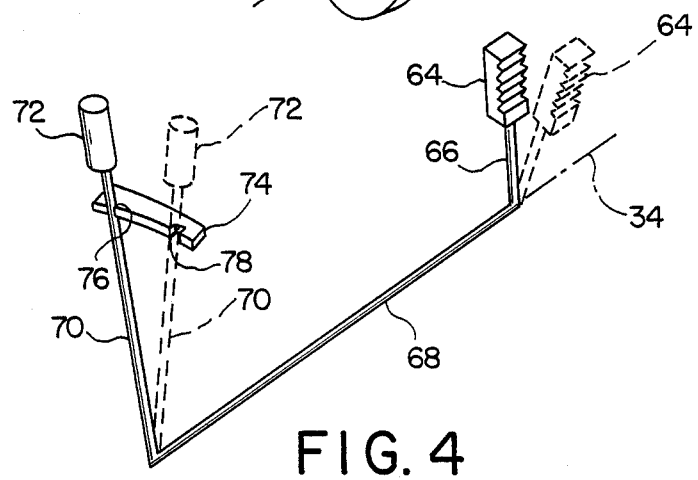
FIG. 4 is a perspective view of a locking mechanism included in the auxiliary support system shown in FIG. 1.

In the embodiment shown in FIGS. 1-5, a mechanical type locking means is seen in FIGS. 3 through 5 which includes a notched sector 42 at the upper end of right arm 28. A foot operated lever 44 formed with a tooth 46 engagable with a notch in sector 42 is provided for momentary locking the supporting arms 26 and 28 against pivotal rotation. Lever 44 is supported by a shaft 48 extending from the side thereof, which shaft is journaled in a bearing 50 attached to the frame 14 by any suitable means, not shown. The pivot axis 52 of lever 44 extends parallel with axis 34 about which arms 26 and 28 normally are pivotable. A foot pad 54 is formed on the lever intermediate the front end of the lever and the fulcrum 48 for downward pivotal movement of the forward end of the lever under foot pressure, and engagement of tooth 46 with a notch in arm 28 to lock the arms 26 and 28 against pivotal movement. Spring means of any suitable type is included for resiliently biasing the forward end of level 44 upwardly to maintain the tooth 46 out of engagement with the notched sector 42 so long as the front of the lever is not urged downwardly against the spring bias by the operator. For purposes of illustration only, a leaf spring 56 is shown, which spring is attached to the frame 14 by bracket 58. The spring engages the lower surface of lever 44 to resiliently bias the front end of the lever upwardly for normal disengagement of the tooth 46 and notched sector 42. To facilitate disengagement of the tooth from the notched sector the lever may be provided with a rearwardly extending portion 44A formed with a foot pad 60 that also is engagable by the operator's foot. Any frictional force between the engaged tooth 46 and notch 42 may be overcome by the combination of the force of spring 56 on lever 44 and the manual force applied to foot pad 60.

Means are provided for releasably locking lever 44 in arm locking position, with teeth 42 and 46 interengaged. The illustrated locking means includes a second tooth 62 which extends laterally outwardly from lever 44 adjacent the forward end thereof. A notched block 64 located at the end of a movable arm 66 is adapted for engagement with tooth 62 to maintain lever 44 in the locked position. Arm 66 is located at and extends radially from one end of a shaft 68 which is journaled in the tubular shaft 30. The other end of the shaft is provided with a radially extending operating arm 70 having a handle 72 at the outer end thereof. Operating arm 70 is movable between a released position, shown in full lines in FIGS. 1-5, and a locking position shown in broken lines in FIG. 4. In the locking position, one of the notches at the rearward face of notched block 64 engages tooth 62 on arm 44 to maintain the arm in the locked position. Detent means 74 in the form of a plate with first and second notches 76 and 78 at the edge thereof are provided for releasably holding operating arm 70 in full line unlocked position and broken line locking position. The releasable locking means may be movable along axis 34 to allow for movement of arm 70 into and out of engagement with one of the notches in plate 74. Plate 74 is attached to the vehicle frame 14 through a supporting bracket 80.

Although the operation of the auxiliary support system is believed to be apparent from the above description, a brief description now will be provided. During operation at speeds greater than low speed, the teeth 42 and 46 on arm 28 and lever 44, respectively, are disengaged whereby wheel supporting arms 26 and 28 are free to pivot together about axis 34 of interconnecting shaft 30. One or both wheels 38,38 engages the ground as the vehicle moves therealong. During this operation, the auxiliary support system is not needed and does not contribute significantly to stability of the vehicle. When traveling at slow speeds, in traffic, and in preparation for stopping, the forward end of lever 44 may be depressed by foot pressure on pad 54 for engagement of tooth 46 with notched sector 42 on arm 28 to lock the arms 26 and 28 against pivotal motion about axis 34. It will be noted that in the unlocked condition, the arms 26 and 28 constantly oscillate slightly about axis 34 with normal riding motion of the vehicle such that no difficulty is encountered in engaging tooth 46 on lever 44 with teeth on arm 28. With the teeth engaged, arms 26 and 28 are locked in position whereby the vehicle is made stable, and tipping over is prevented.

As seen in FIGS. 2 and 3, foot pad 54 preferably is located adjacent the rear brake pedal 82 of the vehicle, such that with the operators heel positioned on the vehicle foot rest 84 (FIGS. 2 and 5) both pedals 54 and 82 may be depressed simultaneously, or they may be operated individually. When stopping only momentarily, as for a stop sign or signal, lever 44 may be held in the locked position by the operator. When movement is resumed and the speed increased sufficiently such that the vehicle is easily balanced, foot pressure on lever 44 may be released whereupon the front end of the lever is pivoted upwardly under operation of spring means 56 to disengage tooth 46 from teeth 42. If the teeth remain engaged when the pressure on foot pad 54 is released due to frictional engagement between teeth, then foot pad 60 may be pushed to release the lever 44 from arm 28.

When parking the vehicle, lever 44 may be locked in the arm locked condition by pivoting operating arm 70 rearwardly from notch 76 to notch 78 in detent plate 74. In this position, notched block 64 engages tooth 62 on arm 44 to lock the arm in position. Now, to release lever 44 from arm 28, lever 70 must first be pivoted forwardly to release block 64 from tooth 62. With the arms locked in position by lever 44, and lever 44 locked in position by notched block 64, it will be apparent that the vehicle is stably supported, and no stand, or the like, is required for upright support thereof.

It will be readily apparent that the invention is not limited to use of mechanical means for locking arms 26 and 28 against pivotal rotation about axis 3. Reference now is made to FIGS. 6 and 7 of the drawings wherein a modified form of this invention is shown which includes electrically operated means for releasably locking the auxiliary wheel supporting arms against pivotal rotation when stopped or traveling slowly. Only one arm 28A is shown which corresponds, essentially, to arm 28 shown in the FIG. 1-5 embodiment. Arm 28A is connected by shaft 30A to a second arm 26, not shown, at the opposite side of the vehicle, and ground engaging auxiliary wheels 38, 38 are provided at the lower ends of the arms. Arm 38A differs from arm 38 in that no notches 42 are formed at the circular sector adjacent the forward end of the arm.

In FIGS. 6 and 7 the unnotched circular sector is identified by reference numeral 42A. Electrically operated locking means 86 are provided for releasably locking arm 28A against pivotal movement. As best seen in FIG. 7, locking means 86 includes an inverted U-shaped housing 88 attached by bracket 90 to the frame of the vehicle by any suitable means not shown. Opposite downwardly extending arms 92,92 of housing 88 straddle the upper edge of circular sector 42A, and electrically operated solenoids 94,94 are attached to the inner faces of the arms. Opposing solenoid armatures 96,96 are provided with friction brake pads 98,98 which are adapted for frictional engagement with arm 28a at opposite sides thereof to releasably lock the arm against pivotal movement.

The solenoids are adapted for connection to the vehicle voltage source through an operator controlled switch, not shown. When the switch is actuated, the pads 98,98 are moved into locking engagement with the arm 28A, and when the switch is released, the solenoid armatures are spring biased for return to the illustrated arm released condition. When traveling slowly, or when stopped, the solenoids may be energized to lock the arms 26 and 28A against pivotal rotation thereby stabilizing the vehicle. Instead of using an operator controlled switch to control solenoids 98,98, the switch may be triggered by means responsive to vehicle speed such that the solenoids are energized when the vehicle speed is less than a predetermined low speed.

If desired, locking means 86 may be provided with a second pair of solenoids and associated friction pads which pads are spring biased into engagement with arm 28A when no power is supplied to the solenoids. These solenoids are energized when the vehicle electrical system is energized to release this set of pads from arm 28A. In this way, when the vehicle is parked, arms 26 and 28A are locked in position for upright support of the vehicle. Instead of energizing the second pair of solenoids when the vehicle electrical system is energized, they may be energized when the vehicle speed exceeds a predetermined low speed. Below such low speed, the second pair of solenoids is deenergized to lock the arms of the auxiliary support system in position. Alternatively, a manually operated mechanical locking mechanism may be provided in addition to the electrically operated solenoids 94,94 for locking arms 26 and 28A against pivotal motion when the vehicle is parked.

Reference now is made to FIGS. 8 and 9 wherein another modified form of this invention is shown which includes means for locking the auxiliary wheel system against upward pivotal movement at low speeds or when stopped. Again, only one arm 28B is shown which corresponds, essentially, to arms 28 and 28A shown in the above-described embodiments. Arm 28B is connected by shaft 30B to a second arm 26, not shown, at the opposite side of the vehicle, and ground engaging auxiliary wheels 38,38 are provided at the lower ends of the arms. Arm 28B differs from arm 28A in that a pawl 102 is pivotally attached to the inside surface of the arm by a pivot pin 104 extending from the arm. A spring 106, also attached to arm 28B, resiliently biases the pawl in the direction for engagement with a ratchet wheel 108.

A pulley 110 is affixed to ratchet wheel 108, and the pulley and ratchet wheel are rotatably mounted on shaft 30B. Pulley 110 is connected by a belt 112 to a second pulley 114 connected to the main rear wheel of the two-wheel vehicle by means not shown. The belt also engages the drive pulley of a generator 116 for drive actuation of both the generator 116 and ratchet wheel 108 when the vehicle is moving. The belt is driven in the direction of arrow 118 such that the pawl 102 rides over the ratchet wheel teeth during rotation of the ratchet wheel.

An electrical solenoid 120 is attached to arm 28B adjacent the pawl 102, and the solenoid winding is connected to the generator output. When the vehicle reaches a predetermined speed such that the generator output is sufficient to energize the solenoid 120, pawl 102 is withdrawn from the ratchet wheel 108, and the ratchet wheel is free to rotate without the production of clicking sounds produced by engagement thereof by the pawl.

As with the other embodiments of this invention, at least one wheel 38,38 engages the ground at all times under operation of gravity and resilient biasing means, such as spring 40, as described above. At normal high speed operation of the vehicle, generator 116 produces a sufficiently high output for energization of solenoid 120 to withdraw pawl 102 from engagement with ratchet wheel 108. When the vehicle speed reduces below a speed such that the output from generator 116 is no longer adequate to energize solenoid 120 for withdrawal of pawl 102 from ratchet wheel 108, the pawl is biased by spring 106 into engagement with wheel 108. Now, a clicking sound is produced as the pawl rides over the ratchet wheel teeth. When the vehicle is stopped, the ratchet wheel is locked against rotary movement by the belt connection to drive pulley 14, which drive pulley now is stationary. Upward rotation of arm 28B (in a counterclockwise direction as viewed in FIG. 8) now is prevented by engagement of pawl 102 with the stationary ratchet wheel. It will be apparent, then, that when the vehicle is stopped it is stably supported in an upright position by such locking of the arms 26 and 28B against upward rotation about the axis of interconnecting shaft 30B.

The invention having been described in detail in accordance with requirements of the patent statutes, other changes and modifications will suggest themselves to those skilled in this art. For example, it will be apparent that the auxiliary support system of this invention is not limited to use on motorcycles. Use on other two wheel vehicles including those having a housing, or cockpit, within which the operator is seated is contemplated. Also, the invention is not limited to locating the auxiliary wheel axes ahead of the rear main wheel axis. In addition, combination mechanical and electrically operated means may be used for releasably locking the auxiliary wheel assembly against upward pivotal movement. It is intended that the above and other such changes and modifications shall fall within the spirit and scope of the invention as defined in the appended claims.

I claim:

1. In a vehicle having frame means supported on a pair of main ground engaging wheels in line with one another, an auxiliary wheel assembly comprising,
   a connecting shaft journaled for pivotal movement about an axis extending transversely of the vehicle,
   right and left arms attached to said connecting shaft adjacent opposite ends thereof and extending rearwardly and downwardly therefrom at opposite sides of the vehicle,
   right and left auxiliary ground engaging wheels rotatably supported by said right and left arms, respectively, and
   releasable locking means engagable with the auxiliary wheel assembly and operable between locking and unlocked conditions, in said locking condition said auxiliary wheel assembly being locked against upward pivotal movement about the connecting shaft axis to provide stable support for the vehicle in an upright position, in said unlocked condition said auxiliary wheel assembly being free for up and down pivotal movement about the connecting shaft axis whereby at least one of said auxiliary wheels remains in ground contact at substantially all times including banked turn operation of the vehicle.

2. An auxiliary wheel assembly as defined in claim 1 wherein said releasable locking means includes a generally circular sector on one of said right and left arms adjacent said connecting shaft, and
   means releasably engagable with said circular sector for releasably locking said one arm against pivotal movement.

3. In a vehicle having frame means supported on a pair of main ground engaging wheels in line with one another, an auxiliary wheel assembly comprising,
   a connecting shaft journaled for pivotal movement about an axis extending transversely of the vehicle,
   right and left arms attached to said connecting shaft adjacent opposite ends thereof and extending rearwardly and downwardly therefrom at opposite sides of the vehicle,
   right and left auxiliary ground engaging wheels rotatably supported by said right and left arms, respectively, said auxiliary wheel assembly being free for pivotal movement about the connecting shaft axis under operation of gravity for engagement of at least one of said auxiliary wheels with the ground,
   releasable locking means engagable with the auxiliary wheel assembly for releasably locking the same against upward pivotal movement about the connecting shaft axis to provide stable support for the vehicle in an upright position when the auxiliary wheel assembly is locked against upward pivotal movement by said releasable locking means,
   said releasable locking means including a generally circular sector on one of said right and left arms adjacent said connecting shaft, and
   means releasably engagable with said circular sector for releasably locking said one arm against pivotal movement, said means releasably engagable with said circular sector including a pivotal lever and said circular sector including radially extending teeth engagable by said pivotal lever for preventing pivotal movement of the one arm.

4. The auxiliary wheel assembly as defined in claim 3 wherein said pivotal lever is foot operated.

5. An auxiliary wheel assembly as defined in claim 4 wherein said pivotal lever extends adjacent a foot operated brake pedal of the two wheel vehicle for simultaneous braking of the motor cycle and operation of said lever into locking condition by the vehicle operator if desired.

6. An auxiliary wheel assembly as defined in claim 3 including means releasably engagable with said lever for releasably locking said lever in engagement with said circular sector.

7. An auxiliary wheel assembly as defined in claim 6 wherein said means for releasably locking said lever includes a locking member movable into engagement with said lever for preventing release of said lever forms engagement with the circular sector in the locked condition of said means for releasably locking said lever.

8. An auxiliary wheel assembly as defined in claim 7 wherein said locking member is formed with notches adapted for engagement with said lever in the locked condition.

9. An auxiliary wheel assembly as defined in claim 8 wherein said locking member is pivotally mounted for pivotal movement into and out of engagement with said lever.

10. An auxiliary wheel assembly as defined in claim 9 wherein said connecting shaft is tubular,
    a locking shaft journaled in said connecting shaft upon which said locking member is supported adjacent one end, and
    an operating arm at the opposite end of said locking shaft for manual pivotal movement of said locking member through said locking shaft.

11. An auxiliary wheel assembly as defined in claim 10 including means for releasably locking said operating arm against pivotal movement.

12. An auxiliary wheel assembly as defined in claim 3 including means for resiliently biasing said pivotal lever for movement out of engagement with said circular sector on said one arm.

13. An auxiliary wheel assembly as defined in claim 12 wherein said pivotal lever extends generally longitudinally of the vehicle and is mounted for pivotal movement about a pivot axis intermediate opposite ends of the lever such that one portion of the lever extends forwardly and another portion of the lever extends rearwardly of the pivot axis, said rearwardly extending portion of said lever being engagable by the vehicle operator for pivotal movement of said lever out of engagement with said circular sector.

14. An auxiliary wheel assembly as defined in claim 1 wherein said releasable locking means includes at least one friction pad adjacent one of said right and left arms which pad is movable between engagement with the associated arm for locking the same against pivotal movement and a disengaged condition wherein said arm is free for pivotal movement.

15. An auxiliary wheel assembly as defined in claim 14 including solenoid means for operation of said friction pad into engagement with said one arm.

16. An auxiliary wheel assembly as defined in claim 14 wherein said one arm includes a generally circular sector engagable by said friction pad.

17. In a vehicle having frame means supported on a pair of main ground engaging wheels in line with one another, an auxiliary wheel assembly comprising,
a connecting shaft journaled for pivotal movement about an axis extending transversely of the vehicle,
right and left arms attached to said connecting shaft adjacent opposite ends thereof and extending rearwardly and downwardly therefrom at opposite sides of the vehicle,
right and left auxiliary ground engaging wheels rotatably supported by said right and left arms, respectively, said auxiliary wheel assembly being free for pivotal movement about the connecting shaft axis under operation of gravity for engagement of at least one of said auxiliary wheels with the ground,
releasable locking means engagable with the auxiliary wheel assembly for releasably locking the same against upward pivotal movement about the connecting shaft axis to provide stable support for the vehicle in an upright position when the auxiliary wheel assembly is locked against upward pivotal movement by said releasable locking means,
said releasable locking means including a pair of opposing friction pads at opposite sides of one of said right and left arms which are simultaneously movable into engagement with said arm for locking the same against pivotal movement and are movable to a disengaged condition out of engagement with said arm wherein said arm is free for pivotal movement.

18. An auxiliary wheel assembly as defined in claim 17 including solenoid means for movement of said friction pads into engagement with said one arm.

19. In a vehicle having frame means supported on a pair of main ground engaging wheels in line with one another, an auxiliary wheel assembly comprising,
a connecting shaft journaled for pivotal movement about an axis extending transversely of the vehicle,
right and left arms attached to said connecting shaft adjacent opposite ends thereof and extending rearwardly and downwardly therefrom at opposite sides of the vehicle,
right and left auxiliary ground engaging wheels rotatably supported by said right and left arms, respectively, said auxiliary wheel assembly being free for pivotal movement about the connecting shaft axis under operation of gravity for engagement of at least one of said auxiliary wheels with the ground,
releasable locking means engagable with the auxiliary wheel assembly for releasably locking the same against upward pivotal movement about the connecting shaft axis to provide stable support for the vehicle in an upright position when the auxiliary wheel assembly is locked against upward pivotal movement by said releasable locking means,
said releasable locking means including a ratchet wheel rotatably connected to one of said right and left arms at said connecting shaft,
means for rotating the ratchet wheel upon rotation of the main ground engaging wheels and for preventing rotation thereof when the vehicle is stopped, and
a pawl pivotally attached to said one arm and engagable with said ratchet wheel, engagement of the pawl with the ratchet wheel when rotation of the ratchet wheel is stopped preventing upward pivotal movement of the auxiliary wheel assembly.

20. An auxiliary wheel assembly as defined in claim 19 including a solenoid attached to said one arm for disengaging the pawl from the ratchet wheel when the vehicle exceeds a predetermined speed.

21. In a vehicle having frame means supported on a pair of main ground engaging wheels in line with one another, an auxiliary wheel assembly comprising,
right and left arms at opposite sides of the vehicle,
a connecting shaft extending transversely of the vehicle to which said right and left arms are fixedly attached,
means for journaling said connecting shaft for pivotal movement about the shaft axis, said right and left arms and connecting shaft being pivotally movable as a unit,
right and left auxiliary ground engaging wheels rotatably supported by said right and left arms, respectively, at least one of said auxiliary wheels engaging the ground at substantially all times during vehicle operation including banked turn operation thereof, and
means movable into and out of engagement with at least one of said left and right arms and connecting shaft for releasably locking the same against pivotal movement in the engaged locking condition thereof, the auxiliary wheels providing stable support for the vehicle in an upright position in the locking condition of the releasable locking means.

22. An auxiliary wheel assembly as defined in claim 21 wherein said releasable locking means is movable into and out of engagement with said right arm.

23. An auxiliary wheel assembly as defined in claim 22 wherein said releasable locking means comprises a foot operated lever.

24. An auxiliary wheel assembly as defined in claim 22 wherein said releasable locking means comprises a solenoid operated friction pad.

25. An auxiliary wheel assembly as defined in claim 1 wherein the releasable locking means is free of the auxiliary wheel assembly in the unlocked condition thereof.

26. An auxiliary wheel assembly as defined in claim 21 wherein the releasable locking means is free of the auxiliary wheel assembly in the unlocked condition thereof.

* * * * *